Aug. 28, 1962     C. E. MILES     3,051,410
CABLE TAKE-UP DEVICE
Filed April 6, 1959     2 Sheets-Sheet 1
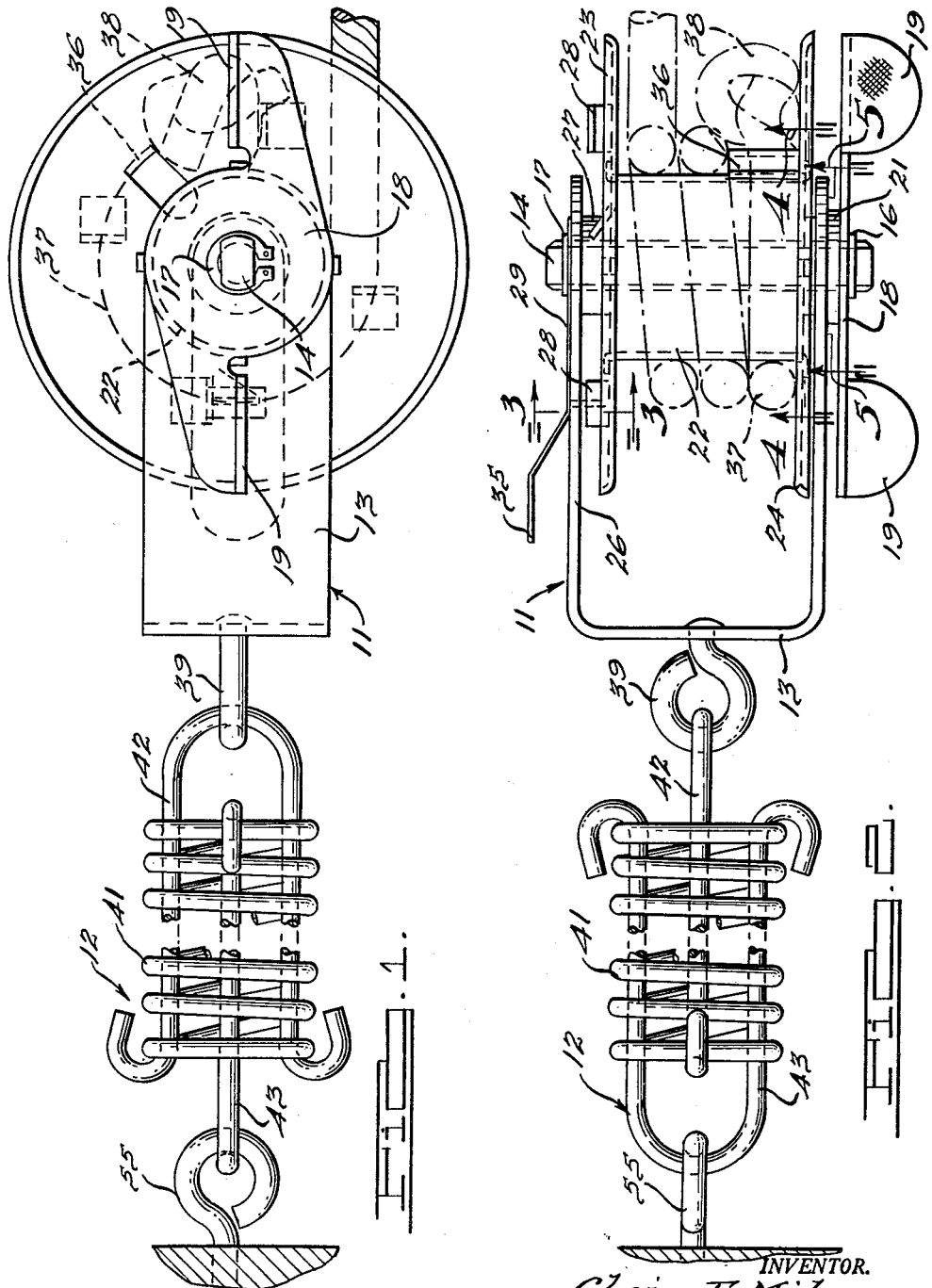
INVENTOR.
Clair E. Miles,
BY
Harness, Dickey & Pierce
ATTORNEYS.

Aug. 28, 1962   C. E. MILES   3,051,410
CABLE TAKE-UP DEVICE
Filed April 6, 1959   2 Sheets-Sheet 2
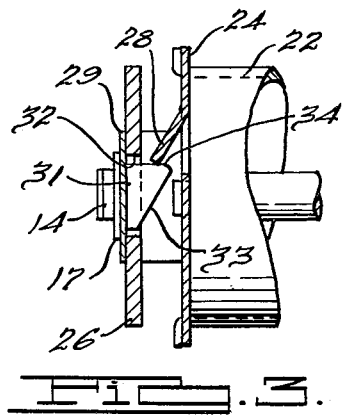
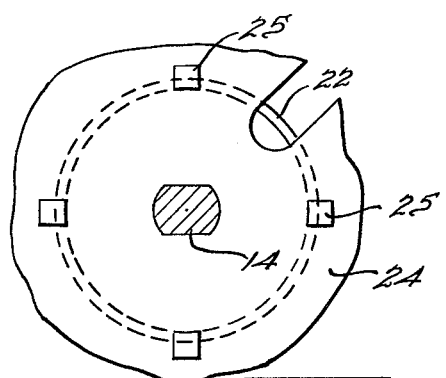
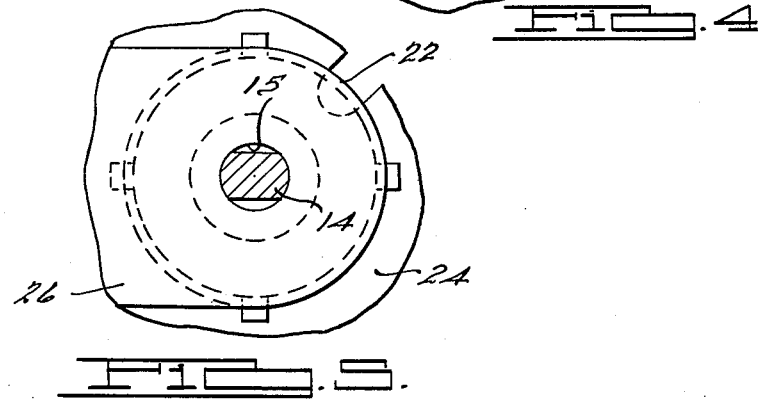
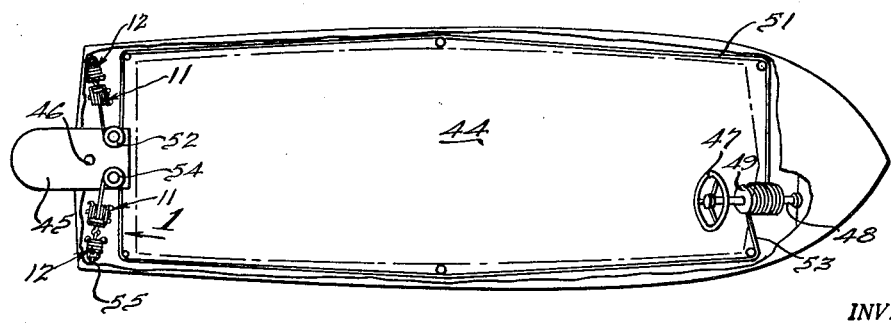
INVENTOR.
*Clair E. Miles.*
BY
*Harness, Dickey & Pierce*
ATTORNEYS

United States Patent Office 3,051,410
Patented Aug. 28, 1962

3,051,410
CABLE TAKE-UP DEVICE
Clair E. Miles, 22504 Bayview, St. Clair Shores, Mich.
Filed Apr. 6, 1959, Ser. No. 804,370
1 Claim. (Cl. 242—100)

This invention relates to cable take-up devices, and more particularly to mechanisms for taking up slack in a line or cable having one or both ends fixed and maintaining the tautness of the cable during subsequent operation.

It is an object of the invention to provide a novel and improved take-up device which may be quickly and easily installed at a fixed end of the cable, and which requires a minimum of manipulative effort on the part of the operator, either when it is orginally installed or during later use.

It is another object to provide an improved take-up device of this character which is especially adapted for use in conjunction with a spring tension mechanism provided to maintain cable tautness, and which permits the cable end to be connected to the spring tension mechanism in a rapid and effortless manner.

It is a further object to provide an improved cable take-up mechanism of the above character which is of relatively simple construction, may be fabricated of standard materials, and requires little maintenance.

Other objects, features, and advantages of the present invention will become apparent from the subsequent description, taken in conjunction with the accompanying drawings.

In the drawings:

FIGURE 1 is a side elevational view of the novel take-up mechanism combined with a spring tension device looking in the direction of the arrow "1" of FIGURE 6;

FIGURE 2 is a top view of the mechanism showing the handle and drum;

FIGURE 3 is a fragmentary cross-sectional view taken along the line 3—3 of FIGURE 2 and showing the ratchet components;

FIGURE 4 is a fragmentary cross-sectional view taken along the line 4—4 of FIGURE 2 and showing the manner of mounting the drum on the shaft;

FIGURE 5 is a fragmentary cross-sectional view taken along the line 5—5 of FIGURE 2 and showing the connection between the bail and shaft; and FIGURE 6 is a schematic view showing an adaptation of the invention to a small boat having a remotely controlled outboard motor.

The invention comprises a take-up unit generally indicated at 11 which is shown in combination with a conventional spring tension device generally indicated at 12. The take-up unit comprises a bail 13 formed as a U-shaped strap, and a shaft 14 passing through apertured portions in the outer ends of the bail. Shaft 14 is of non-circular cross-sectional shape, and is shown as flattened on opposite sides, as seen in FIGURE 1. Shaft 14 is rotatable with respect to bail 13 which has circular apertured portions 15, and a pair of retaining rings 16 and 17 are mounted in grooves at the outer ends of the shaft to retain it in position. A handle 18 is mounted on shaft 14 immediately inwardly of retaining ring 16 and has a non-circular aperture of a shape complementary to that of shaft 14, so that the handle is non-rotatably fixed on the shaft. The handle has arms extending in opposite directions from the shaft, and a pair of knurled finger tabs 19 are bent laterally from the main portion of the handle so that it may be rotated by the thumb and forefinger of one hand in a clockwise direction as seen in FIGURE 1. A spacer 21 is rotatably mounted between handle 18 and the adjacent arm of bail 13.

A drum 22 is mounted on shaft 14 inside bail 13, this drum comprising an annular central portion and a pair of flange plates 23 and 24. Drum 22 may be fabricated by forming its main portion of sheet metal, and fastening flanges 23 and 24, formed as stampings, to the opposite edges of the main drum portion by tabs 25 extending from the main portion. Flanges 23 and 24 have non-circular apertures of a shape complementary to that of shaft 14 so that the drum is non-rotatably fixed to the shaft, as seen in FIGURE 4, and have rounded outer edges as seen in FIGURE 2 so as to prevent any wearing or cutting action on the cable wound onto the drum. Flange 23 is spaced a substantial distance from the adjacent arm 26 of bail 13 by a spacer 27, and a plurality of ratchet teeth 28 are struck outwardly from the main portion of flange 23 so as to extend diagonally into the space between this flange and the bail. A leaf spring pawl 29 is carried by shaft 14, this spring having a circular aperture in one end which is mounted on the shaft and held between retaining ring 17 and bail arm 26. An intermediate portion 31 of spring 29 is struck inwardly and extends through a clearance aperture 32 in bail arm 26, as seen in FIGURE 3. Portion 31 acts as a pawl and has one edge 33 which is inclined, so that upon clockwise rotation of drum 22 in FIGURE 1, ratchet teeth 28 will slide past pawl 31, counterclockwise rotation of the parts being prevented by engagement of any ratchet tooth 28 with lateral edge 34 of pawl 31. The outer end 35 of spring 29 is bent outwardly so as to be spaced from bail arm 26 as seen in FIGURE 2, so that pawl 31 may be manually retracted by flexing spring 29 away from the bail.

Flange 24 has an abutment in the form of a tab 36 struck inwardly from the main portion of the flange, as seen in FIGURES 1 and 2. Abutment 36 is so located with respect to the main surface of drum 22, and is of such length, that a cable end shown in dot-dash lines at 37 may be fixed to the drum by tying a knot 38 in that end and slipping cable end 37 between abutment 36 and the main drum surface. For this purpose, it will be noted in FIGURE 2 that abutment 36 is substantially parallel to the drum surface, and that sufficient space is left between the end of abutment 36 and flange 23 to permit cable end 37 to be slipped into place.

The central portion of bail 13 is provided with an eye 39 secured thereto. The illustrated embodiment of the invention is shown in combination with spring tension device 12 which is commonly used in installations such as small boats having remotely controlled outboard motors. The tension device shown comprises a helical compression spring 41 engaged at opposite ends by a pair of U-shaped hook members 42 and 43, so that effort exerted in spreading apart the hook members will cause the spring to compress. The central portion of hook member 42 is shown as being connected with eye 39, so that the central portion of hook member 43 may be mounted on a stationary support.

A typical use of the invention may perhaps best be described with respect to FIGURE 6, which is a schematic plan view showing a small boat 44 having an outboard motor 45 pivotally mounted at 46 on the stern of the boat. Steering of motor 45 is controlled by a remote steering wheel 47 having a shaft 48 with a drum 49. A first cable or line 51 of any appropriate material is secured at one end to drum 49 and extends therefrom along the port side of the boat, the other end of the cable passing around a fixed pulley 52 on one side of motor 45. A second cable 53 is likewise fastened to drum 49 and extends along the starboard side of the boat, being passed around another fixed pulley 54 on motor 45.

It has been customary to fix the ends of cables 51 and 53 to a tension device such as that indicated at 12 in order that the cables may be kept in taut condition. When using take-up unit 11, one end of spring tension device 12 will be fixed to a stationary cleat or other support 55, unit 11 being secured to the other end of the spring tension device as shown in FIGURES 1 and 2. End 37 of cable 51 or 53 may then be passed around drum 22 and, a knot 38 having been made at the end of the cable, end 37 will be slipped under abutment 36, as shown in FIGURE 1. By rotating handle 18, the cable will be wound onto the drum, thereby taking up the cable slack. This winding may be continued until the desired tension has been developed in tension device 12. During this rotation, ratchet teeth 28 will slide past pawl 31, and when handle 18 is released, the pawl will prevent unwinding. Thus, the ends of both cables 51 and 53 may be quickly and easily secured, and the cables placed under proper tension.

During operation of the boat, any slack which may develop in cables 51 and 53 may be immediately taken up by additional rotation of drum 22 by handle 18. It will be noted that this will not involve any disconnection or readjustment of the parts, pawl 31 automatically holding the drum in its new position. Such additional tensioning after prolonged periods of use may be quite important in applications such as small boats, where immediate and closely controlled steering response is required in emergencies. Should it be desired to slacken the cable for removal or reduction of the tension, this may be done by retracting leaf spring pawl 31 after relieving the load thereon by slight rotation of handle 18. It will be understood of course that the invention may be advantageous in applications other than those illustrated and discussed.

The relatively few parts and simplicity of construction of the novel take-up unit should also be observed. Because of the fact that practically all the unit components may be fabricated of conventional materials and by standard stamping or other techniques, the unit cost, especially if mass-produced, will be extremely low.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

In a cable take-up mechanism, a shaft, a bail rotatably connected to opposite ends of said shaft and adapted to secure the shaft to a relatively stationary support, a drum comprising an annular main drum portion and a pair of flange plates non-rotatably secured to said shaft, a handle non-rotatably secured to the shaft for rotating the shaft in one direction, means for securing a cable end to said drum, a plurality of circumferentially spaced ratchet teeth struck diagonally outwardly from one flange plate, a leaf spring pawl extending parallel to the bail arm adjacent said one flange plate and having one end mounted on said shaft, a pawl in the form of a tab struck inwardly from a central portion of said spring pawl, and an apertured portion in said bail arm, said pawl extending through said apertured portion and having an inclined edge and a lateral edge, whereby the ratchet teeth may slide past said pawl when the drum is rotated in one direction, the pawl preventing rotation of the drum in the opposite direction.

References Cited in the file of this patent

UNITED STATES PATENTS

| | | |
|---|---|---|
| 545,255 | Stauffer | Aug. 27, 1895 |
| 567,142 | Kerns | Sept. 8, 1896 |
| 576,958 | Field | Feb. 9, 1897 |
| 675,453 | Sturgess | June 4, 1901 |
| 1,244,445 | Pratt | Oct. 23, 1917 |
| 1,406,882 | MacAulay | Feb. 14, 1922 |
| 1,467,523 | Andlauer | Sept. 11, 1923 |
| 2,063,662 | Doherty | Dec. 8, 1936 |
| 2,466,688 | Culver | Apr. 12, 1949 |

FOREIGN PATENTS

| | | |
|---|---|---|
| 1,000,230 | France | Oct. 10, 1951 |